(12) United States Patent
Li (10) Patent No.: US 12,497,124 B2
(45) Date of Patent: Dec. 16, 2025

(54) BICYCLE STEM BOLT HIDDEN STRUCTURE

(71) Applicant: Mu-Rong Li, Taichung (TW)

(72) Inventor: Mu-Rong Li, Taichung (TW)

(73) Assignee: GREAT GO CYCLES INC.

( * ) Notice: Subject to any disclaimer, the term of this patent is extended or adjusted under 35 U.S.C. 154(b) by 468 days.

(21) Appl. No.: 18/088,776

(22) Filed: Dec. 27, 2022

(65) Prior Publication Data

US 2024/0208603 A1 Jun. 27, 2024

(51) Int. Cl.
B62K 21/18 (2006.01)

(52) U.S. Cl.
CPC .................... B62K 21/18 (2013.01)

(58) Field of Classification Search
CPC ........ B60K 21/18; B60K 21/06; B60K 21/12; B60K 3/04
USPC ........................................................ 280/279
See application file for complete search history.

(56) References Cited

U.S. PATENT DOCUMENTS

| | | | | |
|---|---|---|---|---|
| 5,442,973 A * | 8/1995 | Liao | ..................... | B62K 21/18 |
| | | | | 280/281.1 |
| 5,678,836 A * | 10/1997 | Chen | ..................... | B62K 21/06 |
| | | | | 280/276 |
| 6,234,506 B1 * | 5/2001 | Li | ..................... | B62K 21/18 |
| | | | | 280/280 |
| 7,703,786 B1 * | 4/2010 | Domahidy | ............. | B62K 19/32 |
| | | | | 280/279 |
| 8,020,884 B1 * | 9/2011 | Foley | ..................... | B62K 21/12 |
| | | | | 280/279 |
| 8,267,418 B1 * | 9/2012 | Chuang | ................. | B62J 50/225 |
| | | | | 280/288.4 |
| 10,883,481 B2 * | 1/2021 | Staples | ................. | B62K 19/32 |
| 11,104,399 B2 * | 8/2021 | Wang | ..................... | B62K 21/22 |
| 2006/0038376 A1 * | 2/2006 | Okajima | ............... | B62K 21/18 |
| | | | | 280/276 |
| 2006/0055146 A1 * | 3/2006 | Ueno | ..................... | B62K 21/06 |
| | | | | 280/280 |
| 2008/0073870 A1 * | 3/2008 | Lane | ..................... | B62K 21/06 |
| | | | | 280/280 |
| 2009/0028637 A1 * | 1/2009 | Coaplen | ................ | B62K 21/06 |
| | | | | 384/456 |
| 2012/0261896 A1 * | 10/2012 | Callahan | .................. | B62K 3/04 |
| | | | | 280/282 |
| 2013/0233119 A1 * | 9/2013 | Chang | ..................... | B21K 1/76 |
| | | | | 74/551.8 |
| 2016/0280309 A1 * | 9/2016 | Pacenti | ................. | B62K 21/12 |
| 2018/0118300 A1 * | 5/2018 | Lin | ..................... | B62K 21/18 |
| 2019/0079160 A1 * | 3/2019 | Takizawa | ........... | G01S 5/02216 |

(Continued)

*Primary Examiner* — Hau V Phan (57) ABSTRACT

A bicycle stem bolt hidden structure is provided. The bicycle stem bolt hidden structure includes a base, a connecting member and a cap. The base includes a handlebar side on one end and a tube-through hole on the other end. The connecting member is movably disposed on one side of the tube-through hole; wherein the connecting member has a threaded hole and an annular peripheral groove; and The cap includes a plurality of buckles annularly disposed on one side of the cap; wherein the cap covers the connecting member, and the plurality of buckles engage with the annular peripheral groove, so that the cap and the connecting member forms a bolt hidden space. In use, the plurality of buckles engage the annular peripheral groove, so that the exposed bolt can be hidden in the bolt hidden space.

2 Claims, 9 Drawing Sheets

(56) References Cited

U.S. PATENT DOCUMENTS

2019/0233043 A1* 8/2019 Huang .................. B62K 21/12
2019/0367121 A1* 12/2019 Vandermolen ............ B62L 3/02
2020/0277020 A1* 9/2020 Tang ..................... B62K 21/24

* cited by examiner

BICYCLE STEM BOLT HIDDEN STRUCTURE

FIELD OF THE DISCLOSURE

The present disclosure relates to a bicycle stem bolt hidden structure, and more particularly to a structure that hides the bolt for engaging the stem and the front fork head tube.

BACKGROUND OF THE DISCLOSURE

A bicycle is an excellent method of transportation. The motion of a bicycle comes from manual pedaling, which makes it environmentally friendly and suitable for transportation, competition, and sports. Every component of a bicycle is very important. Whether for riding comfort, stability of the vehicle body or competition ability, etc., the quality and durability of each component must be a goal.

The stem is the core component that controls the steering of the bicycle. It is used to connect the front fork and the handlebars to have the ability to steer and control the direction of the bicycle. The existing connection structure for the stem and the front fork, commonly available on the market, can be found in Patent No. M506087 entitled "Improved vertical tube top cover structure for bicycle." As shown in FIGS. 2 and 3 of TW M506087, the fixed engagement between the stem and the head tube requires start nuts, bolts, fasteners, stem caps and other parts to prevent the stem from breaking away from the top of the head tube.

However, the combination structure of the common stem and front fork has gradually failed to satisfy most bicycle riders. For non-competitive bicycle riders who do not pursue extreme performance, this slight improvement is unnecessary. Therefore, many bicycle riders have begun to prioritize the appearance of the bicycle. As shown in the aforementioned patents, in order to secure the components such as stem caps, start nuts, and others in the head tube, fixing fasteners (bolts) is necessary, which leads to unattractive and direct exposure of the fixing fasteners.

Based on the above-mentioned problems, there is a necessity to solve the disadvantage of engaging the stem and the front fork securely with a bolt, which also prioritizes the appearance of the vehicle.

SUMMARY OF THE DISCLOSURE

The present disclosure provides technical features that a connecting member has an annular peripheral groove, and a cap has a plurality of buckles. In practice, the connecting member is assembled with the bolt and the compression ring to the head tube, and the buckles of the cap are engaged with the annular peripheral groove, so that the base can be prevented from detaching from the top of the front fork head tube and the bolt can be hidden in the bolt hidden space. The disadvantage of the exposed bolt used to prevent the stem from detaching from the front fork head tube is indeed solved.

In order to achieve the above-mentioned objective and effort, the present disclosure provides a bicycle stem bolt hidden structure, including a base, a connecting member, and a cap. The base includes a handlebar side on one end and a tube-through hole on the other end. The connecting member is movably disposed on one side of the tube-through hole; wherein the connecting member has a threaded hole and an annular peripheral groove. The cap includes a plurality of buckles annularly disposed on one side of the cap; wherein the cap covers the connecting member, and the plurality of buckles engage with the annular peripheral groove, so that the cap and the connecting member forms a bolt hidden space.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

For the sake of a detailed understanding of the embodiments of the present disclosure, the description can be read in conjunction with the drawings. As shown in FIG. 1 to FIG. 8, The present disclosure provides a bicycle stem bolt hidden structure, including a base 1, a connecting member 2, and a cap 3. The base 1 includes a handlebar side 11 on one end and a tube-through hole 12 on the other end. The connecting member 2 is movably disposed on one side of the tube-through hole 12. The connecting member 2 has a threaded hole 21 and an annular peripheral groove 22. The cap 3 includes a plurality of buckles 31 annularly disposed on one side of the cap 3. In which the cap 3 covers the connecting member 2, and the plurality of buckles 31 engage the annular peripheral groove 22 to form a bolt hidden space 4.

Figure 6:
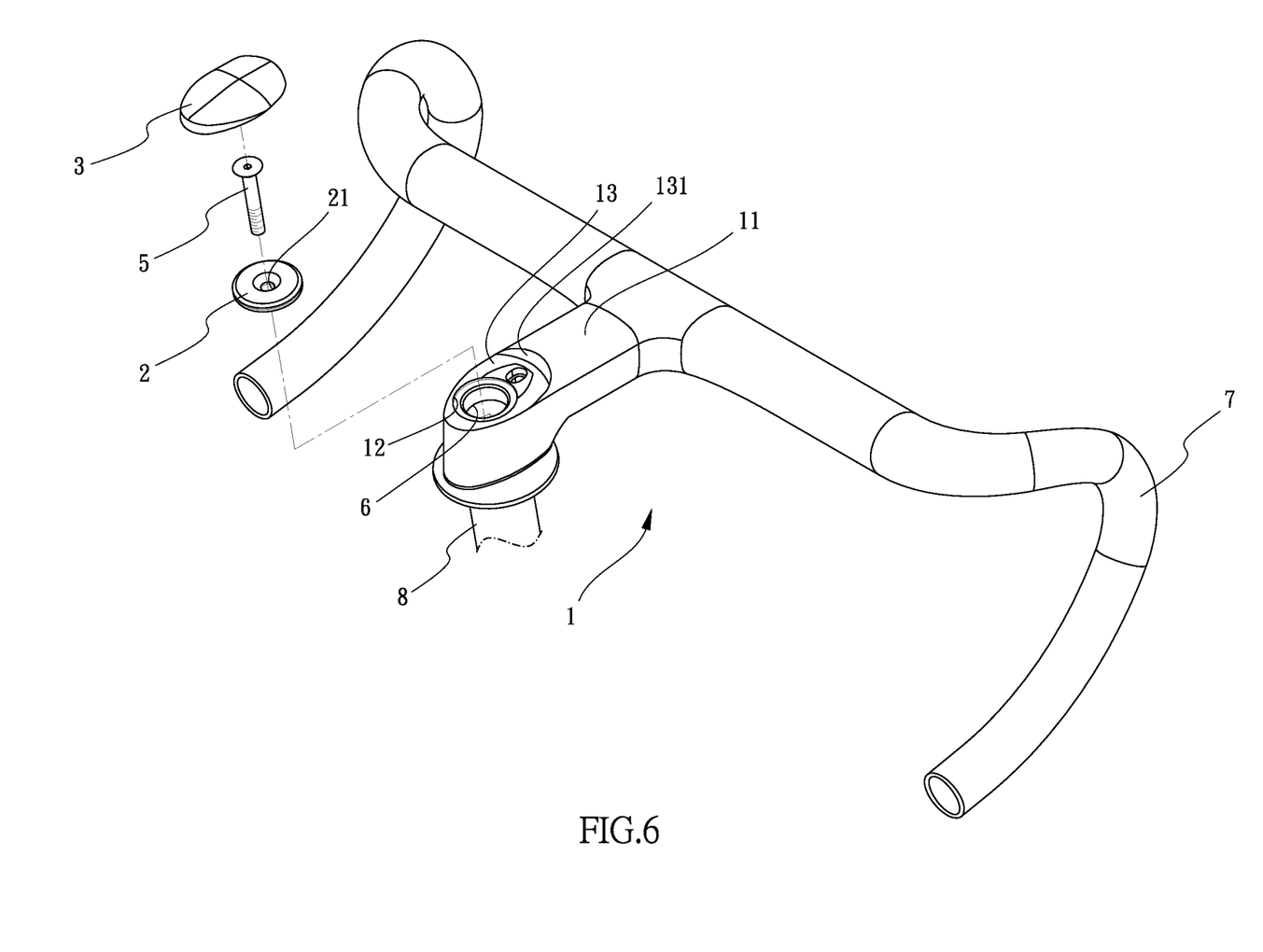
FIG. 6 is a perspective schematic view of assembling the bicycle stem bolt hidden structure on the front fork head tube.
Figure 7:
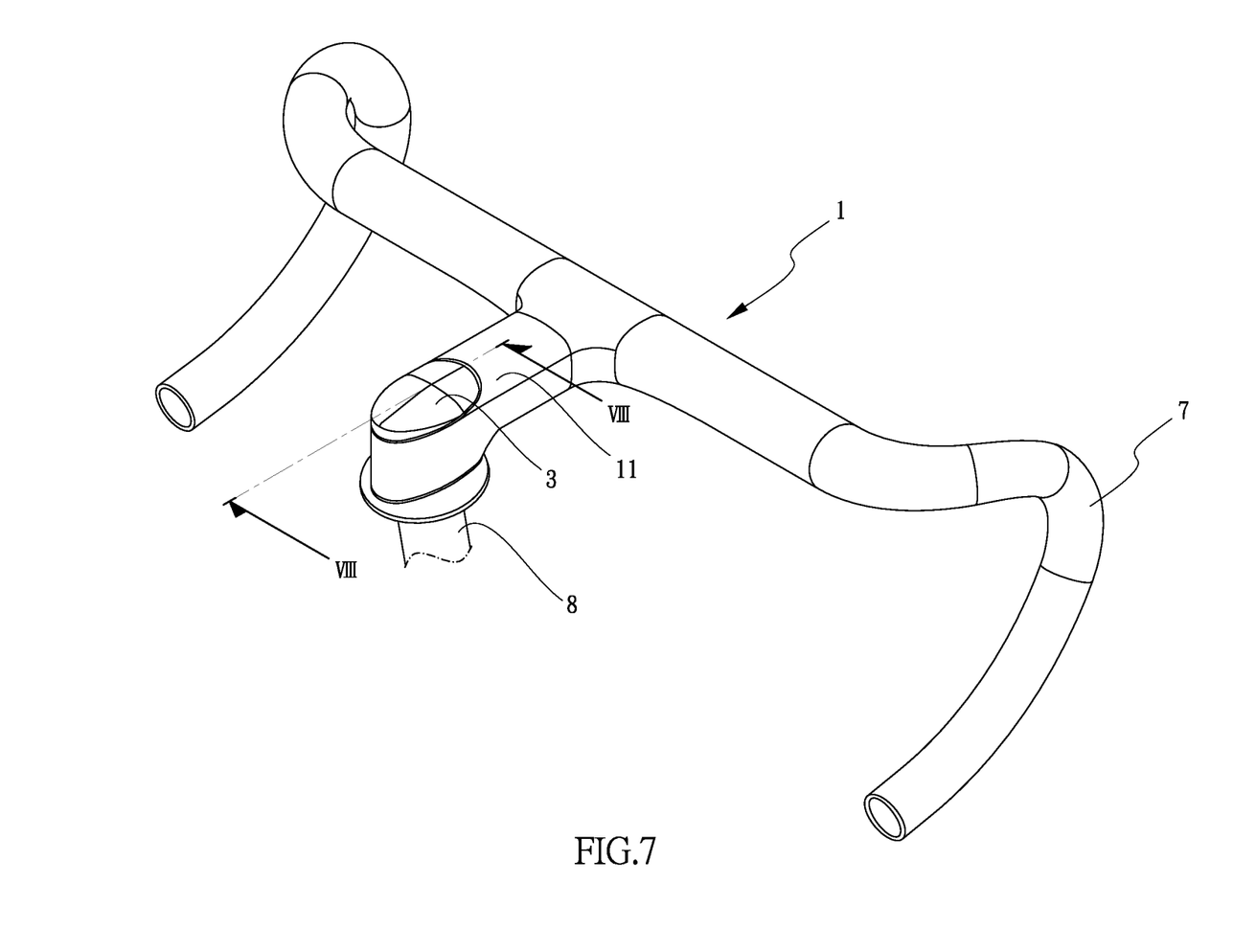
FIG. 7 is a perspective schematic view of assembling the bicycle stem bolt hidden structure completely on the front fork head tube.
Figure 8:
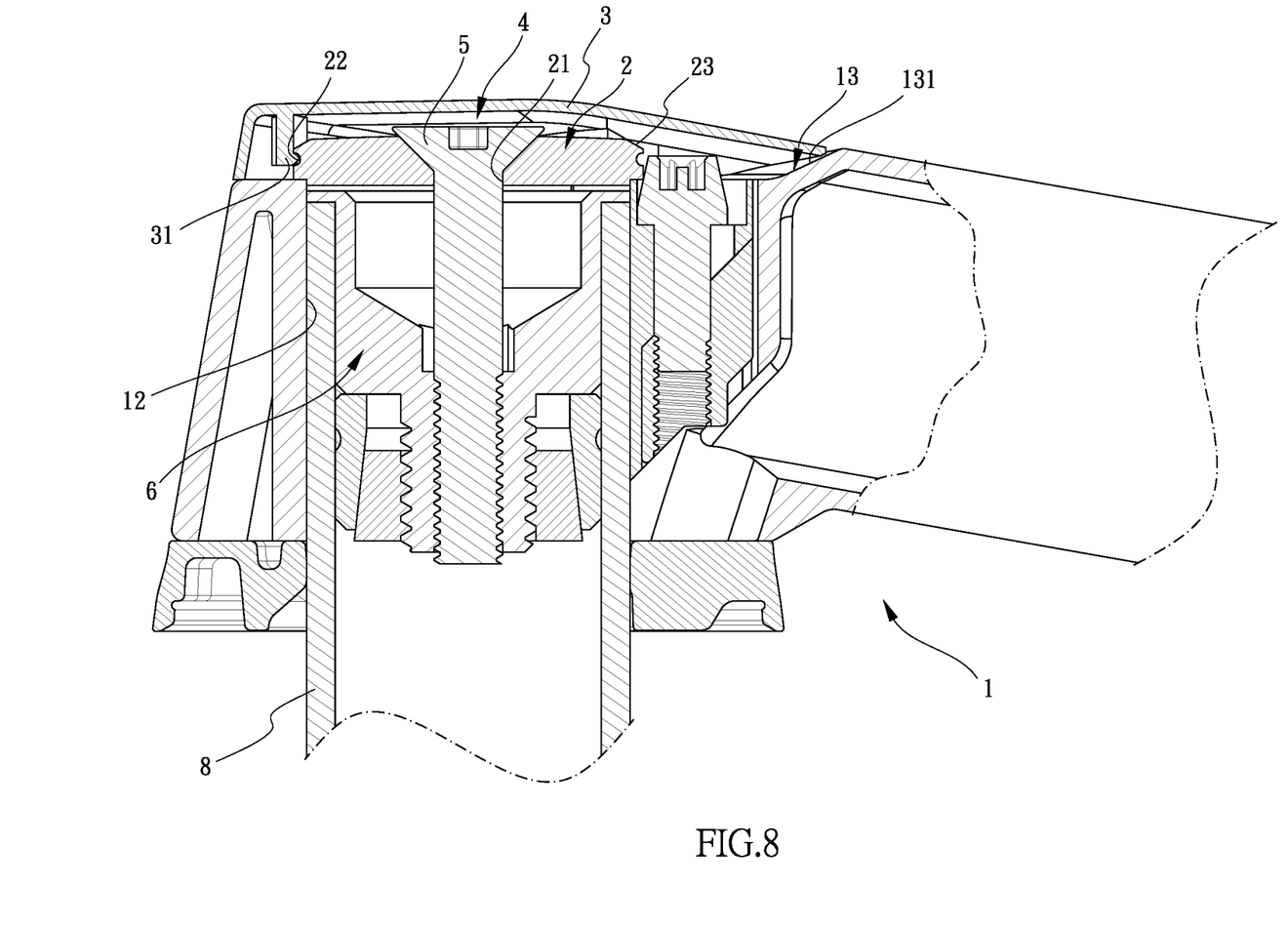
FIG. 8 is a sectional schematic view of line VIII-VIII of FIG. 7.

The embodiments of the present disclosure are more particularly described in the following description. Firstly, the bicycle stem bolt hidden structure of the present disclosure can be illustrated by the figures. The handlebar side 11 of the base 1 connects to the handlebar(s) 7, and the connection between the handlebar side 11 and the handlebar(s) 7 can be assembled or integrally formed. Secondly, as shown in FIG. 6, in the operation of mounting the bicycle stem bolt hidden structure of the present disclosure on a bicycle, the tube-through hole 12 of the base 1 is sleeved around the front fork head tube 8. Then a front fork fastener 6 is placed into the front fork head tube 8, The bolt 5 passes through the threaded hole 21 of the connecting member 2 and threadedly engages with the front fork compression ring 6, the mounting of the base 1 can be fixedly arranged, so as to avoid the base 1 from disassembly from the top of the front fork head tube 8 during riding. The compression ring 6 can also be a start nut, a sun plate, etc., or any other components known in the art, which is no longer described in detail herein. After assembling the base 1, cover the connecting member 2 with the cap 3 through the side having the buckles 31. Further, as shown in FIGS. 7 and 8, the buckles 31 engage with the annular peripheral groove 22 around the peripheral side of the connecting member 2. In this way, the cap 3 is prevented from falling off and forms a bolt hidden space 4 between cap 3 and the connecting member 2.

Accordingly, the exposed bolt 5 will be hidden in the bolt hidden space 4 and no longer affect the appearance of the bicycle. Therefore, the problem that the exposed bolts used on the bicycle to prevent the stem from detaching from the front fork head tube has indeed been resolved.

As shown in FIG. 8, the base 1 has an accommodating groove 13 on one side of the tube-through hole 12 for accommodating the cap 13. The presence of the accommodating groove 13 provides a streamlined and smooth appearance between the base 1 and the cap 3, so as to avoid the obvious sense of stair drop, and allow a more beautiful visual effect.

As shown in FIG. 8, the accommodating groove 13 has an inner surface 131 located near the handlebar side 11, and the inner surface 131 is gradually tilted up toward the handlebar side 11. The inclined design of the inner surface 131 is conducive to the accommodation of the cap 3 compared to the vertical surface, and also less likely to wear the inner wall of the accommodating groove 13 due to repeated placement of the cap 3, which is beneficial to improve product life.

Figure 5:
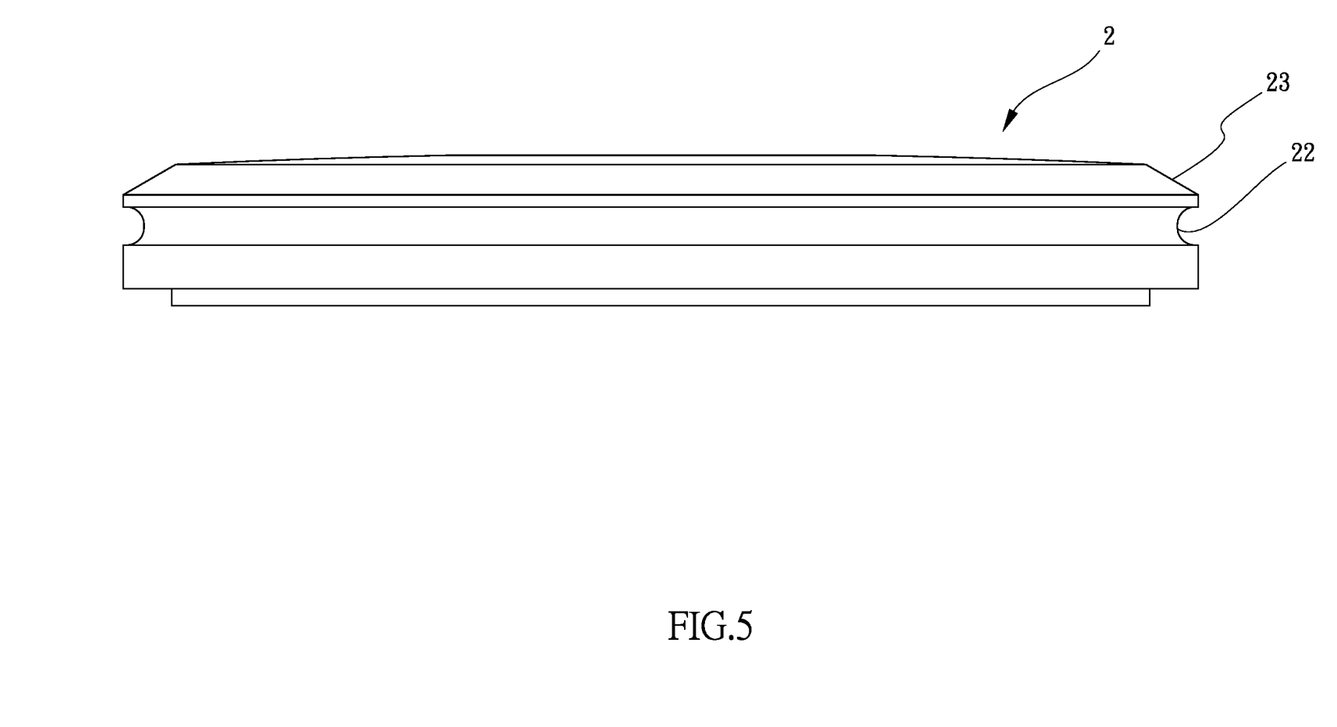
FIG. 5 is a planar schematic side view of the connecting member of the present disclosure.

As shown in FIG. 5 and FIG. 8, the connecting member 2 has an annular slope 23, so that the connecting member 2 is in a frustum-shape. The frustum-shape of the connecting member 2 guides the buckles 31 to the annular peripheral groove 22 when placing the cap 3. The engagement between the cap 3 and the connecting member 2 will be easier without affecting the combined stability.

Figure 1:
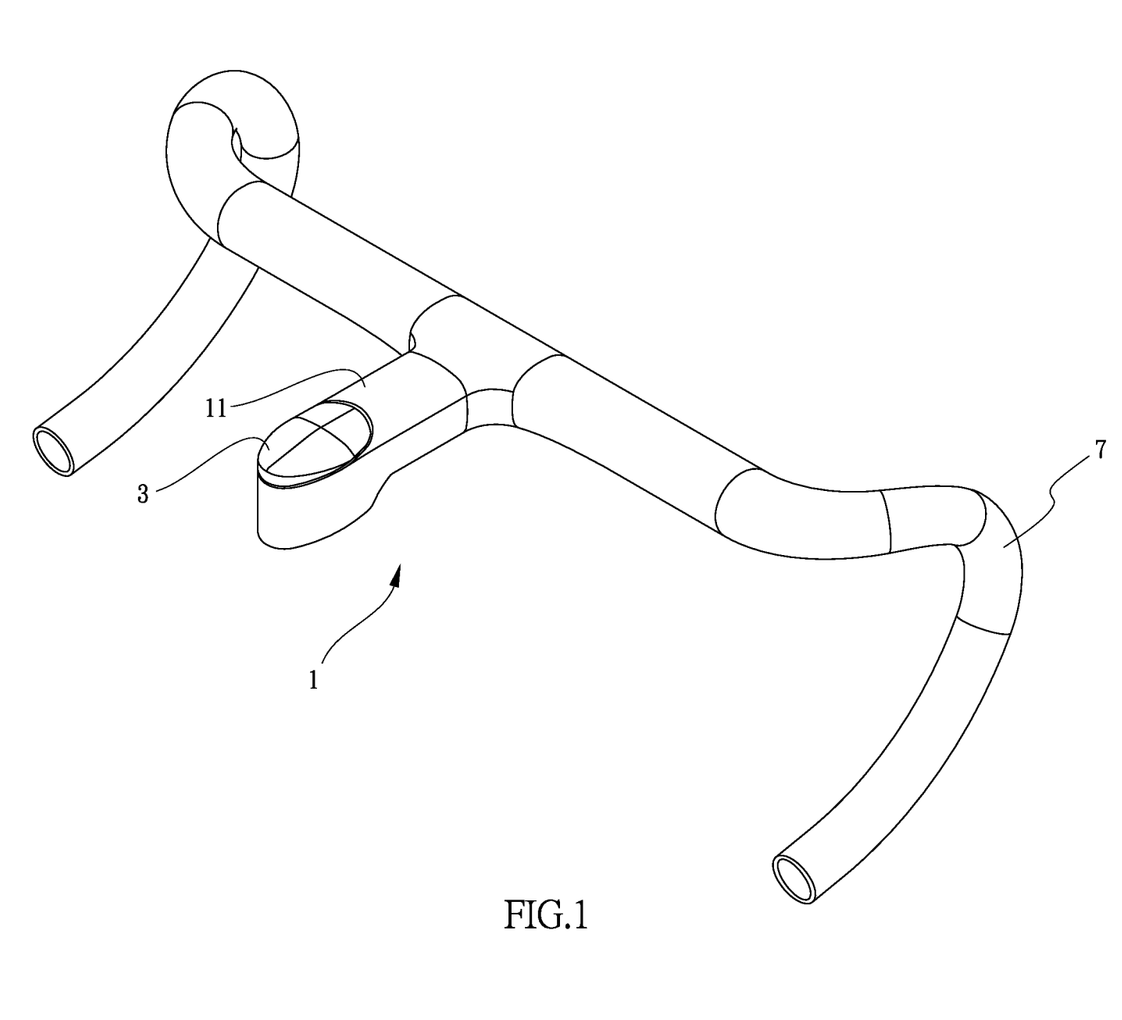
FIG. 1 is a perspective schematic view of the structure of the present disclosure connected with a handlebar.
Figure 2:
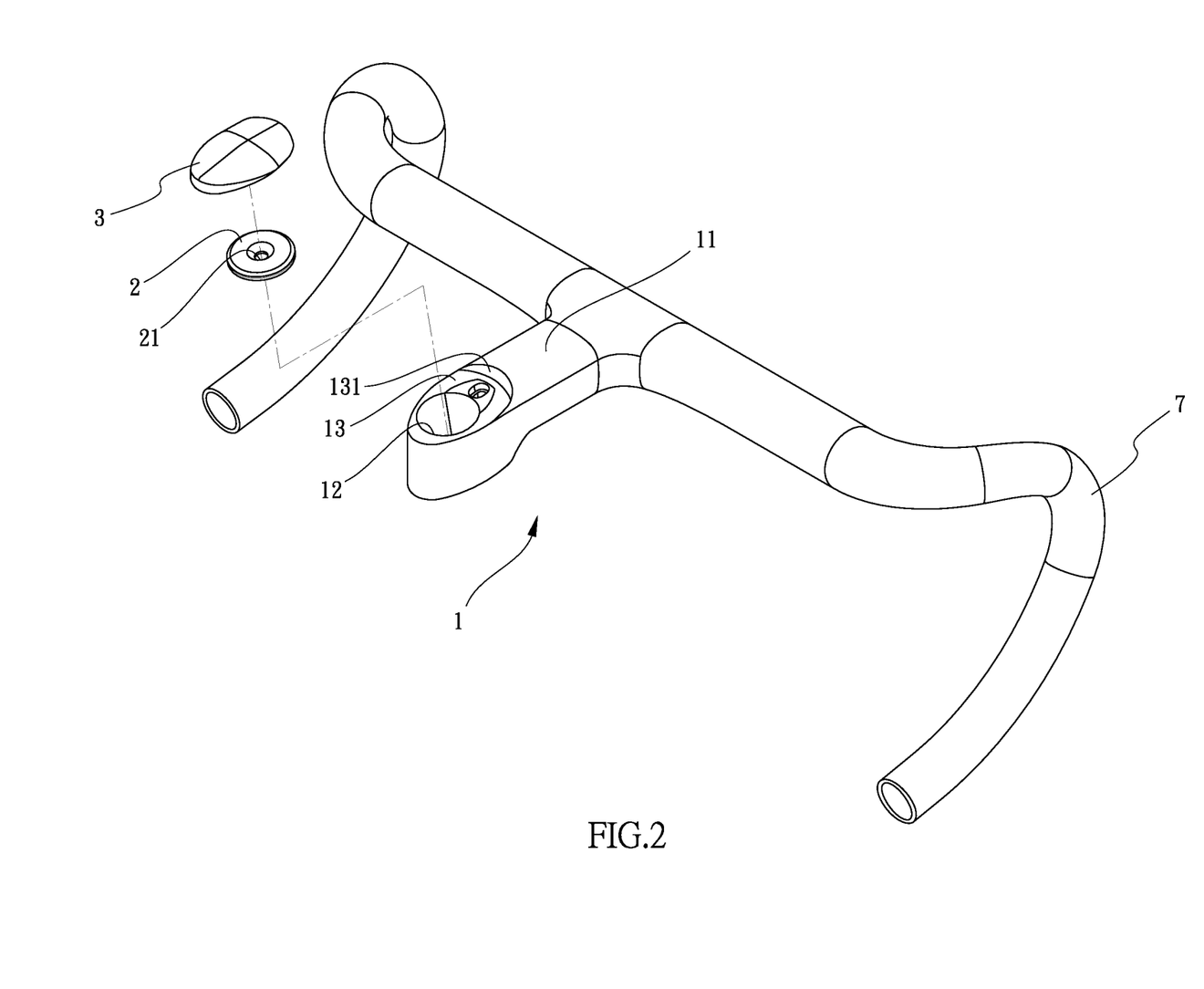
FIG. 2 is an exploded schematic view of the structure of the present disclosure.
Figure 3:
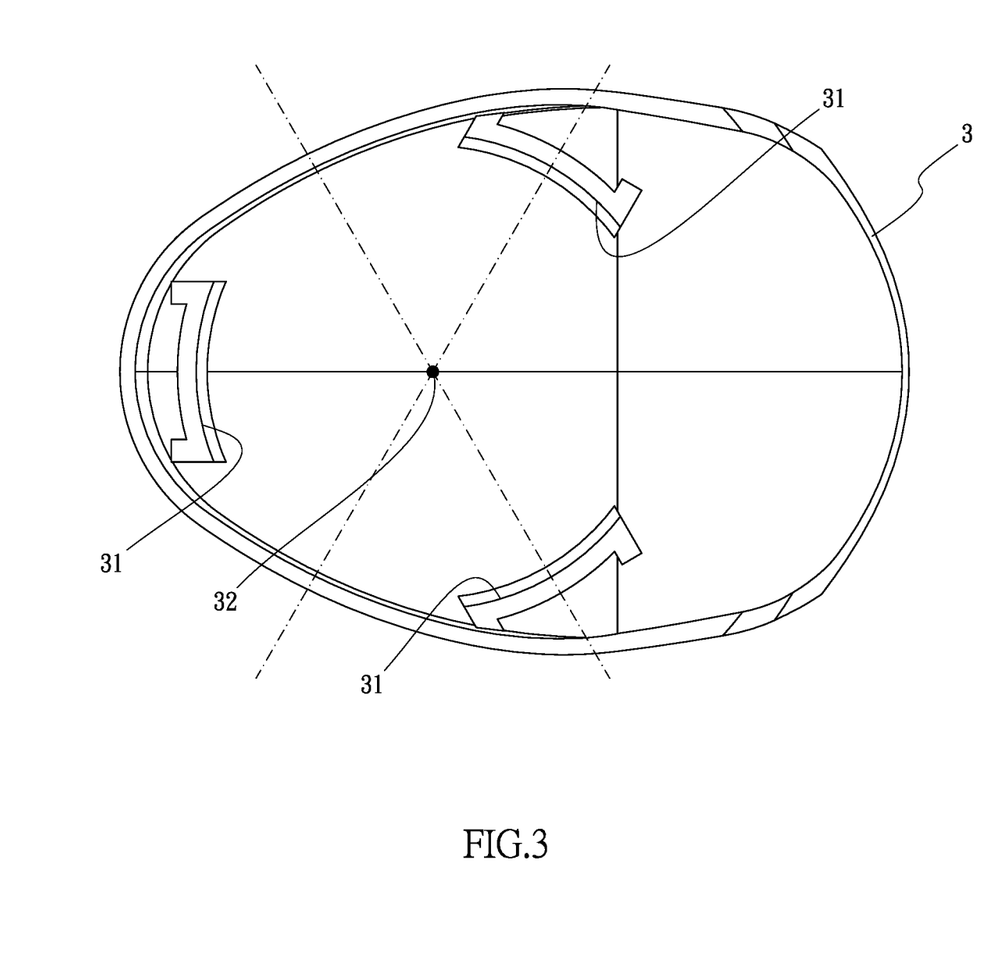
FIG. 3 is a planar schematic bottom view of the cap of the present disclosure.
Figure 4:
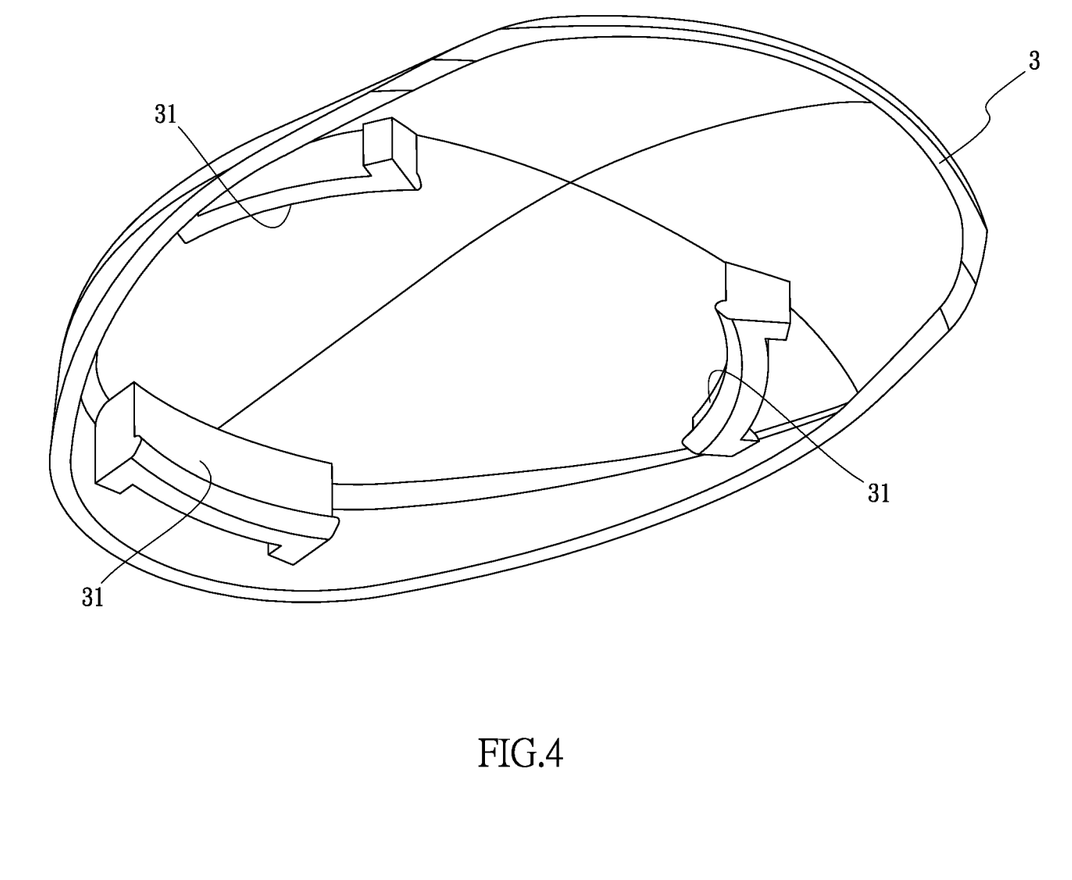
FIG. 4 is a perspective schematic bottom view of the cap of the present disclosure.
Figure 9:
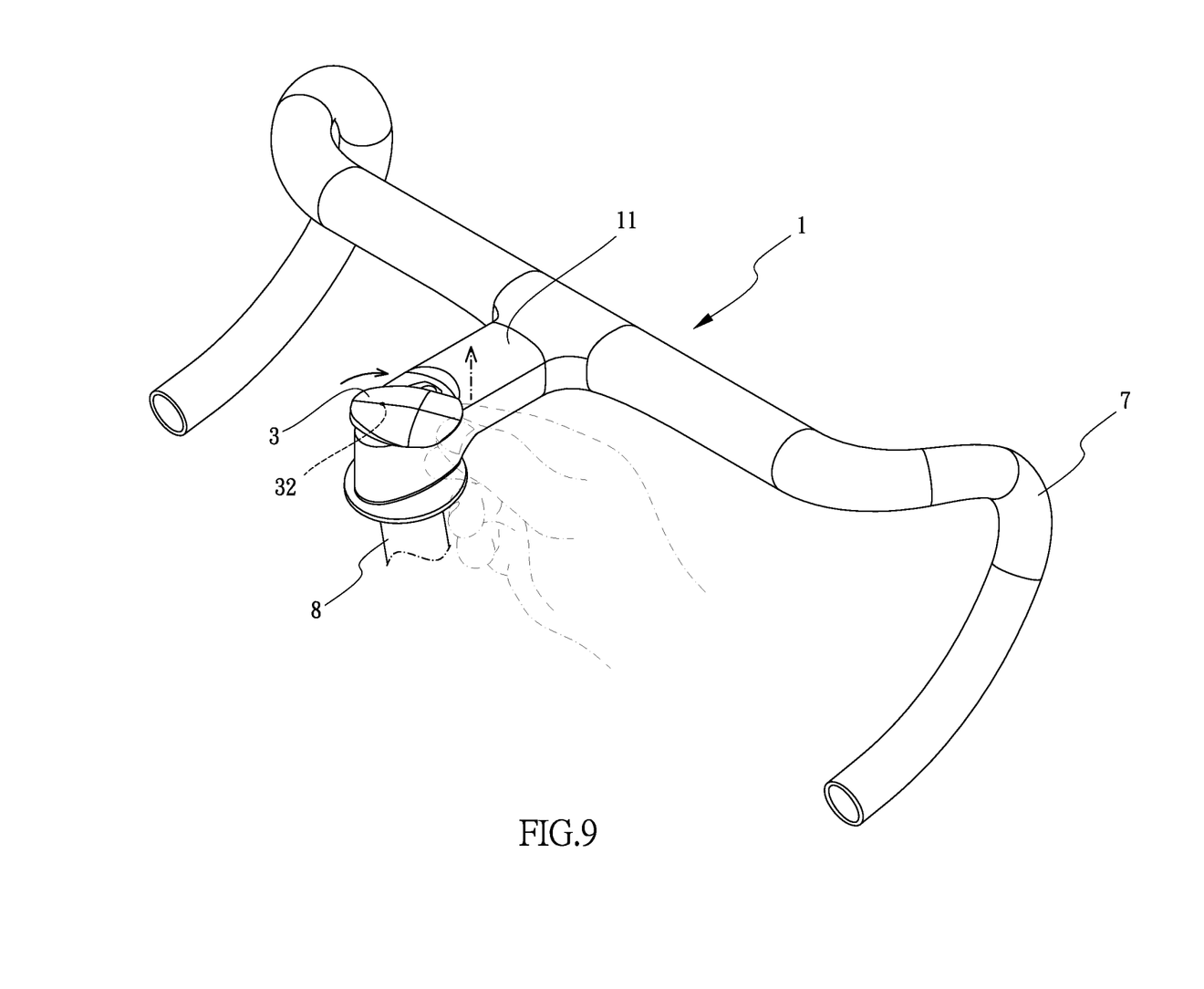
FIG. 9 is a schematic view of twisting the cap of the present disclosure.

As shown in FIG. 3, the center lines of the plurality of buckles 31 form a buckle center 32, and the buckle center 32 is not located at the center point of the cap 3. When the user wants to remove the cap 3, the cap 3 can be turned around the buckle center 32 as shown in FIG. 9.

At this time, part of the upper and lower sides of the cap 3 are exposed, so that the user can easily remove the cap 3 by pinching the exposed part of the cap 3 with fingers.

As shown in FIG. 3, the plurality of buckles 31 is arc-shaped and each of the inner side of the arc of the buckle 31 faces toward to the buckle center 32. The advantage of this structure is that each buckle 31 is curved and fits better in the annular peripheral groove 22 due to the shape of the annular peripheral groove 22 is annular, which allows the user to turn the cap 3 smoothly.

What is claimed is:

1. A bicycle stem bolt hidden structure, comprising:
   a base, including a handlebar side on one end and a tube-through hole on the other end, wherein the base has an accommodating groove on one side of the tube-through hole for accommodating the cap, and the accommodating groove has an inner surface located near the handlebar side, and the inner surface is gradually tilted up toward the handlebar side;
   a connecting member, movably disposed on one side of the tube-through hole; wherein the connecting member has a threaded hole and an annular peripheral groove, and the connecting member has an annular slope, so that the connecting member is in a frustum-shape; and
   a cap, including a plurality of buckles annularly disposed on one side of the cap; wherein the cap covers the connecting member, and the plurality of buckles engage with the annular peripheral groove, so that the cap and the connecting member forms a bolt hidden space, and wherein the center lines of the plurality of buckles form a buckle center, and the buckle center is not located at the center point of the cap.

2. The bicycle stem bolt hidden structure according to claim 1, wherein the plurality of buckles are arc-shaped and each of the inner side of the arc of the buckle faces toward the buckle center, and each buckle is curved and fits in the annular peripheral groove due to the annular shape of the annular peripheral groove, so that the cap is turned smoothly.

* * * * *